May 31, 1932.  T. J. SMULSKI  1,860,370

MOTOR BRUSH HOLDER

Filed Aug. 1, 1929  2 Sheets-Sheet 1

Witness:
William P. Kilroy

Inventor:
Theodore J. Smulski
By Hill & Hill Attys.

May 31, 1932.  T. J. SMULSKI  1,860,370
MOTOR BRUSH HOLDER
Filed Aug. 1, 1929   2 Sheets-Sheet 2
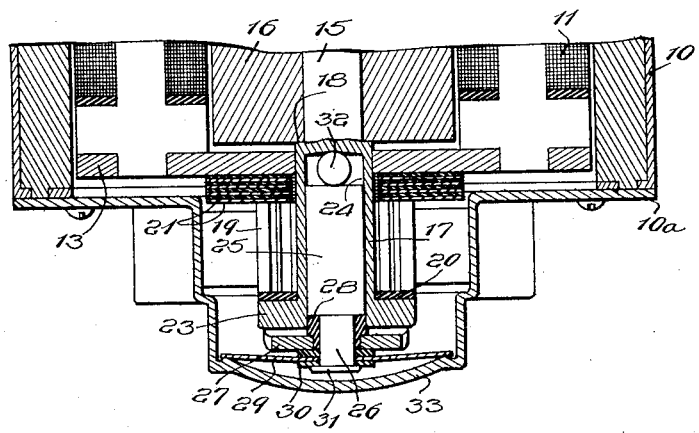
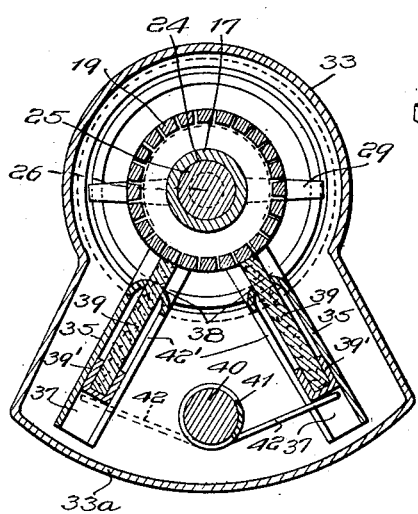
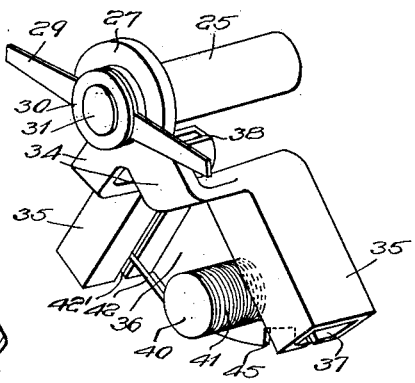
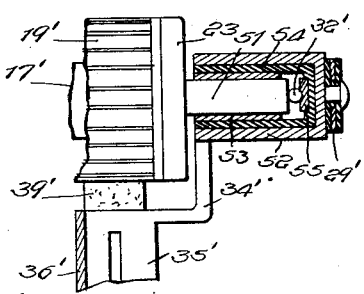
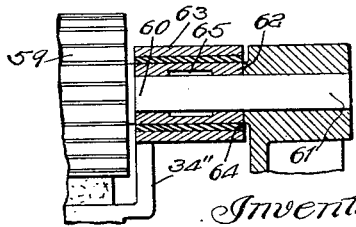
Inventor:
Theodore J. Smulski Patented May 31, 1932

1,860,370

UNITED STATES PATENT OFFICE

THEODORE J. SMULSKI, OF LAKE ZURICH, ILLINOIS, ASSIGNOR TO THE ANDERSON CO.,
OF GARY, INDIANA, A CORPORATION OF INDIANA

MOTOR BRUSH HOLDER

Application filed August 1, 1929. Serial No. 382,774.

My invention relates generally to electrical apparatus and more particularly to an improved brush holder assembly for carrying the brush cooperating with the commutator on a motor, generator or similar electrical apparatus. The invention has among its objects the production of a brush holder of the kind described which is simple, compact, durable, efficient, reliable and satisfactory for use wherever found applicable. More particularly the same has as an object the production of a brush holder of the kind described that is so related or mounted relative the commutator that wear in main shaft bearings or vibration of the apparatus does not in any way affect uniformity of the brush contact with the commutator, any vibration of the rotor producing a corresponding vibration of the brush assembly or brush carrier with the commutator so that perfect contact of the brush with the commutator is secured at all times. The invention also has as an object the production of a brush assembly of the kind described that is compact, making the same particularly suitable for employment on small electrical apparatus that may be conveniently adjusted and that may be easily assembled with or disassembled from the commutator, permitting ready cleaning of the commutator or inspection or removal thereof. The same also permits perfect lubrication of the parts without in any way impairing the efficiency of the electric circuit. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 3 is a sectional view taken substantially on line 3—3 of Fig. 1;

Fig. 4 is a sectional view taken substantially on line 4—4 of Fig. 2;

Fig. 5 is a perspective view of the brush carrier shown in Fig. 1;

Fig. 6 is a sectional view illustrating a modified embodiment of the invention; and Fig. 7 is a similar view of another embodiment of the invention.

Figure 1:
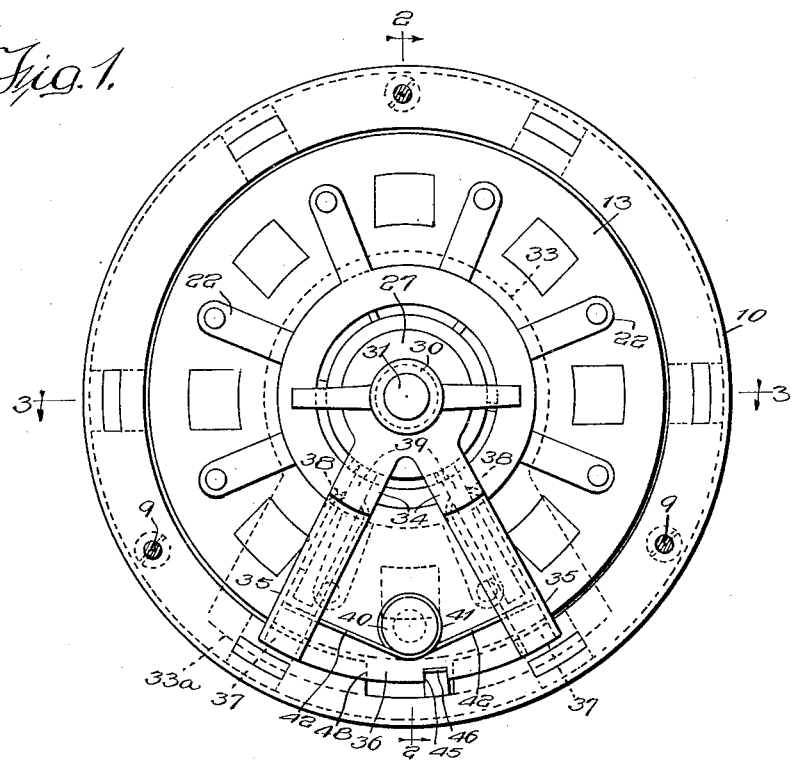
Fig. 1 is a view in elevation of an electrical device embodying the invention, the cover plate removed.

Referring particularly to Figs. 1 to 5, in which a preferred embodiment of the invention is shown as applied to an electrical motor of the type illustrated in my copending application, for electric motor, filed February 5, 1929, Serial No. 337,604, it may be mentioned that the particular type of motor, generator or apparatus in itself forms no part of the present invention, this being illustrative in order to describe the construction, application and operation of my improvements. In the motor shown, 10 represents a casing within which is arranged an armature designated generally as 11. The armature 11 includes a disk 13 and a ring or annulus 14, the disk and annulus as well as the housing 10 being constructed of non-magnetic material. The disk 13 is constrained to rotate with the shaft 15 which is rotatably journaled in a boss 16, which in this instance is formed integral with the housing 10 (see Fig. 2). Extending between the annulus 14 and the disk 13 are the desired number of electromagnets, eight being shown, it being unnecessary to describe the magnets, their cores and similar details of the armature and the fields. It may be mentioned, however, that in this particular motor inner and outer field bars are provided.

Figure 2:
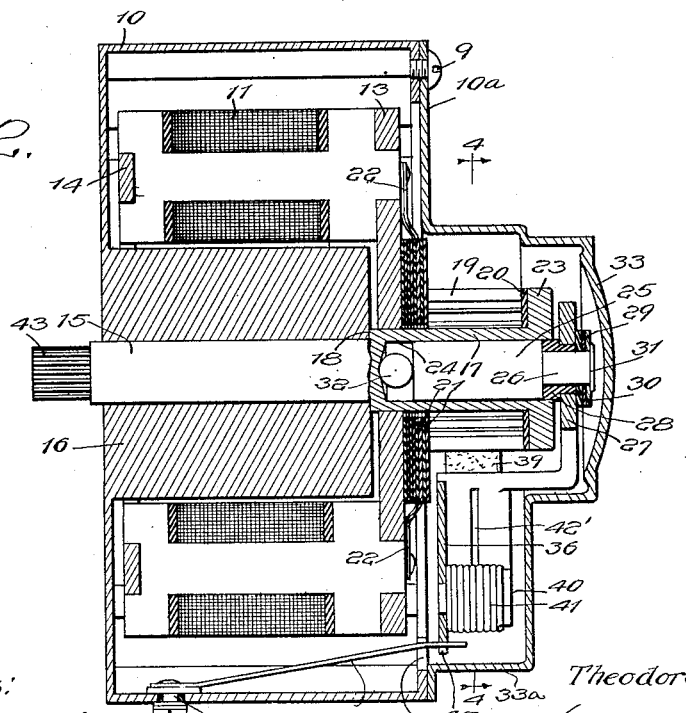
Fig. 2 is a sectional view taken substantially on line 2—2 of Fig. 1.

Referring particularly to Figs. 2 and 3, the shaft 15 projects beyond the bearing 16, as indicated at 17, and carries the rotor consisting of the disc 13 and associated parts of the armature, and the same also carries the commutator bars 19. The outer ends of the commutator bars are arranged in the support 20 preferably of insulating material while the inner ends are supported in the insulating members 21 and connected through the connections 22 with the proper windings of the armature. This is shown in the copending application above referred to and need not be described herein, as the details of the armature windings and commutator construction form no part of the present invention. A shoulder 18 on the shaft limits the inward movement of the shaft. As shown the extending end 17 of the shaft is provided with a head 23, the commutator bars being mounted between the head 23 and disc 13. In the construction shown in Figs. 1 to 5, the shaft part 17 is provided with a tubular bore 24 of a size to receive and form a bearing for the floating shaft 25 which carries the brush assembly, as will be more fully described hereinafter. The outer end of 25 is extended as at 26 and carries a member 27 which is secured thereto, but insulated therefrom by insulation 28 and 30. The same also carries a spring member 29 preferably of resilient material which is electrically connected to 25 and provides a ground through 33 (or 10a), the member 27, spring 29, and insulation 28 and washer 30 being secured in assembled relation on 25, by upsetting or riveting over the end 31, it being understood that any equivalent construction may be employed. The housing is provided with a cover or closure 10a, formed to provide a commutator housing 33, the lower portion being formed as indicated at 33a, to receive the brush carrier. Arranged within the bore 24 is a ball 32 or the equivalent which forms a bearing for the inner end of the floating shaft 25, which is maintained in position substantially as shown in Fig. 2 by the engagement of the spring 29, with the inner side of the cover part 33.

Carried by the member 27 are the brush holders 35, the same being connected to 27 by the angularly shaped connections 34. There may be any desired number of brushes, this depending on the design of the motor or generator, the device herein illustrated having two brushes. The brush holding members 35 are shown connected by a web part 36 which provides a convenient carrier for the brush springs. As shown the members 35 are preferably tubular as indicated at 37 and open at the outer ends and at the inner ends at 38, so that the brushes 39 inserted at the outer ends of the tubular bores 37 may project inwardly in contact with the commutator bars. The brushes 39 are of material generally used for this purpose, and may be provided with caps 39' on the ends if desired. Carried by the web 36 is a stud 40 which carries the brush spring 41, the ends 42 of which project through slots 42', into the bore 37 and engage the outer ends of the brushes 39, the resiliency of the spring arms 42 tending to move the brushes 39 inwardly and maintain them in engagement with the commutator bars. While in this particular instance two brushes and brush holders are shown, it is obvious that there may be one or more brushes and holders therefor, inasmuch as the load of the brush assembly is comparatively light, there is little, if any, wear on shaft 25.

As most clearly shown in Figs. 1, 2 and 5, the web 36 is provided with a notch 45, and a member 46 suitably connected to the binding post 47, extends through the opening 48 in the flange on the housing, into the housing part 33a and engages the web in the notch 45. The member 46 maintains the brush assembly against rotation with the shaft 15 and secures it in a desired adjustment. The brush, however, may be readjusted as desired by adjusting the member 46 at its its point of connection to the housings or in any other suitable or equivalent way. As shown in Fig. 2, the shaft 15 is provided with gear teeth 43, it being obvious, however, that any other means of drivingly connecting the shaft 15 to the cooperating part, whether driving or driven, may be employed.

Obviously when the shaft 15 rotates, whether the same is driving or is being driven, the rotor comprising the armature and commutator bars turn with the shaft. The brush assembly, however, although carried by the shaft does not rotate with it. It will be noted that by so mounting the commutator portions on the shaft, and the brush assembly in the shaft, that where there is wear in the main motor shaft bearings, consequent or resulting vibrations does not in any way affect the brush contact with the commutator, any vibration of the motor shaft producing a corresponding vibration of the brush assembly or brush carrier. In other words the brush is carried independently of the main bearing for the shaft and is not affected by wear because of loads on the main bearing. It will be noted that the device may be easily assembled or disassembled. By removing the cover plate 10a, the commutator and brush and end of the armature are fully exposed. The brush assembly may be removed either independently of the armature or with the armature as a unit. The device may be easily adjusted for changing the operation of the device. While I have herein referred to a motor, I wish to be understood as including any electric apparatus whether motor, generator, or otherwise, to which the improved construction is applicable.

Another embodiment of the invention is shown in Fig. 6 in which 17' represents the shaft 19′ commutator bars, and 23 the end corresponding to 23, shown in Fig. 2. In this embodiment the shaft 17′ is extended as at 51, the same carrying the sleeve 52. The sleeve 52 is provided with the insulated bushing 54 and the bearing sleeve 53. As shown 52 carries the brush holder 35′ connected by the member 34′ to the sleeve. If desired the ball 32′ may be employed as a bearing and a wear bearing 55 may be inserted, so that pressure of the spring 29′ will maintain the device on the shaft without undue wear or friction.

In the construction shown in Fig. 7, the commutator 59 is arranged on the shaft 60, which in this case is supported in an outboard bearing 61. Arranged on the shaft is a bearing sleeve 62 provided with insulation 64, which carries the sleeve 63 provided with the part 34″, carrying the brush; the container however is not shown in detail. The sleeve 62 may be provided with a groove 65 in which grease or other lubricant may be provided. Obviously, in this construction the brush carrier being carried by the same support as the commutator, any vibration will not prevent uniform contact being maintained between the brushes and commutator bars.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a dynamo-electric machine and in combination, a housing provided with an inwardly projecting shaft bearing, a shaft projecting through said bearing and into the housing, an armature mounted on said shaft concentrically to said bearing, a commutator arranged on the shaft at the end of said bearing, said shaft shouldered to provide a thrust bearing, a brush carrier mounted on said shaft, a brush carried by said carrier and contacting with said commutator, means cooperating with the housing for maintaining said shaft shoulder against the inner end of said housing bearing and said carrier on the shaft, and means for engaging said brush carrier and retaining the same against rotation on said shaft in the housing.

2. In a dynamo-electric machine and in combination, a housing provided with a bearing, a shaft projecting through said bearing into the housing, an armature mounted on said shaft concentrically to said bearing, a commutator arranged on the shaft at the inner end of said bearing, said shaft shouldered to provide a thrust bearing for engagement with the end of the housing bearing, a brush carrier mounted on said shaft, brushes carried by said carrier and contacting with said commutator, means for maintaining said shaft in operative position with said shoulder against said housing bearing and said carrier on the shaft, and means for engaging said brush carrier and retaining the same against rotation with said shaft.

3. In a dynamo-electric machine and in combination, a housing, an armature shaft projected thereinto, an armature and commutator therefor mounted on said shaft and rotatable therewith, a brush arranged to operatively engage with said commutator, a brush carrier mounted on said shaft, said carrier being nonrotatable with the shaft, resilient means cooperable with the housing for maintaining said carrier in desired position longitudinally of said shaft, and means carried by said housing for retaining said carrier against rotation upon rotation of the shaft, armature and commutator.

4. In a dynamo-electric machine and in combination, a housing, an armature shaft projected thereinto, an armature and commutator therefor mounted on said shaft and rotatable therewith, a brush arranged to operatively engage with said commutator, a brush carrier, said shaft provided with a recess in the inner end thereof, a floating shaft projecting into said recess and operatively connected with and forming a part of said brush carrier, and means for retaining said parts in operative relation.

5. In an electrical device and in combination, a housing provided with a bearing, a shaft mounted in said bearing, a rotor including an armature and commutator secured to and carried by said shaft, a brush member cooperating with said commutator, a carrier for said brush loosely mounted on said shaft, a ball positioned between said shaft and carrier substantially in the axial line of rotation of said shaft, means for retaining the carrier in engagement with said ball, and means for locking said carrier against rotation with the shaft.

6. In an electrical device and in combination, a housing provided with a bearing, a shaft mounted in said bearing and projecting into said housing, an armature and commutator secured to said shaft, a brush carrier mounted on said shaft, brushes mounted in said carrier and operatively related to said commutator, means for retaining the carrier against rotation with said shaft, and means engageable with said carrier and shaft and cooperable with said housing for maintaining said carrier and shaft against longitudinal movement with respect to said bearing.

7. In an electrical device and in combination, a housing provided with a bearing, a shaft mounted in said bearing and projecting into said housing, a shoulder formed on said shaft, an armature and commutator secured to said shaft, a brush carrier mounted on said shaft, brushes mounted in said carrier and operatively related to said commutator, a ball positioned between said shaft and carrier in the axial line of rotation of said shaft, means for retaining the carrier against rotation with said shaft, and resilient means operatively related to said carrier, ball and shaft and cooperable with said housing for urging said shoulder toward one end of said bearing and for yieldingly maintaining said carrier in operative position longitudinally of and with respect to said shaft.

In witness whereof, I hereunto subscribe my name this 16th day of July, A. D. 1929.

THEODORE J. SMULSKI.